United States Patent
Lee et al.

(10) Patent No.: US 7,626,957 B2
(45) Date of Patent: Dec. 1, 2009

(54) HOME AGENT MANAGEMENT APPARATUS AND METHOD

(75) Inventors: Hak-goo Lee, Suwon-si (KR);
Young-keun Kim, Incheon Maetropolitan (KR); Sun-woo Kim, Suwon-si (KR); Sang-hyun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1055 days.

(21) Appl. No.: 10/751,436

(22) Filed: Jan. 6, 2004

(65) Prior Publication Data

US 2004/0196797 A1 Oct. 7, 2004

(30) Foreign Application Priority Data

Apr. 4, 2003 (KR) .................... 10-2003-0021413

(51) Int. Cl.
*H04Q 7/00* (2006.01)
(52) U.S. Cl. ........................... 370/313; 370/349
(58) Field of Classification Search .............. 370/313, 370/349, 338, 200, 254, 331, 389, 352–356, 370/401, 329, 328, 351; 455/433
See application file for complete search history.

(56) References Cited

U.S. PATENT DOCUMENTS

| 5,862,345 | A  | * | 1/1999  | Okanoue et al. ........... 709/238 |
| 6,847,633 | B1 | * | 1/2005  | Ryu et al. .................... 370/352 |
| 7,136,365 | B2 | * | 11/2006 | Nakatsugawa et al. ...... 370/331 |
| 7,218,609 | B2 | * | 5/2007  | Borella et al. ............... 370/230 |
| 2001/0016492 | A1 | * | 8/2001  | Igarashi et al. .............. 455/433 |
| 2002/0006133 | A1 | * | 1/2002  | Kakemizu et al. ........... 370/401 |
| 2002/0057669 | A1 | * | 5/2002  | Joung ......................... 370/351 |
| 2002/0186679 | A1 | * | 12/2002 | Nakatsugawa et al. ...... 370/349 |
| 2002/0188562 | A1 | * | 12/2002 | Igarashi et al. ................ 705/40 |
| 2003/0018810 | A1 | * | 1/2003  | Karagiannis et al. ........ 709/238 |
| 2003/0021253 | A1 | * | 1/2003  | Jung .......................... 370/338 |
| 2004/0085957 | A1 | * | 5/2004  | Verma ........................ 370/389 |
| 2004/0114554 | A1 | * | 6/2004  | Okajima et al. ............. 370/329 |
| 2004/0162058 | A1 | * | 8/2004  | Mottes ....................... 455/411 |
| 2004/0168050 | A1 | * | 8/2004  | Desrochers et al. ......... 713/153 |
| 2006/0274670 | A1 | * | 12/2006 | Matsumoto ................. 370/254 |

* cited by examiner

*Primary Examiner*—CongVan Tran
(74) *Attorney, Agent, or Firm*—Sughrue Mion, PLLC (57) ABSTRACT

A home agent management apparatus and method for routing a packet using a home network equipment as a home agent in a mobile Inter Protocol version 6 (IPv6) are provided. The home agent management apparatus includes a packet analyzer, which receives a packet and analyzes the packet; a database, which stores information indicating whether a home agent of a home network operates normally according to the result of the analysis; and a home agent function executor, which performs a home agent function in place of the home agent when the home agent does not operate normally. Accordingly, a load concentrated on a home agent of an Internet Service Provider (ISP) can be split.

13 Claims, 11 Drawing Sheets

ISP INTERFACE:
   2001:1234:5678:1000::0/52

⋮

2001:1234:5678:3000::0/52

HOME NETWORK INTERFACE:
   2001:1234:5678:4000::0/52

⋮

2001:1234:5678:9000::0/52

ROUTER INTERFACE:
   2001:1234:5678:A000::0/52

| HOME AGENT ADDRESS1 | CoA1 | COUNT1 |
|---|---|---|
| HOME AGENT ADDRESS2 | CoA2 | COUNT2 |
| ⋮ | ⋮ | ⋮ |

| HOME AGENT ADDRESS1 | HOME ADDRESS1 | CoA1 | LIFETIME1 | SEQUENCE1 |
|---|---|---|---|---|
| HOME AGENT ADDRESS2 | HOME ADDRESS2 | CoA2 | LIFETIME2 | SEQUENCE2 |
| ⋮ | ⋮ | ⋮ | ⋮ | ⋮ |

FIG. 13

HOME AGENT MANAGEMENT APPARATUS AND METHOD

CROSS-REFERENCE TO RELATED APPLICATIONS

This application claims the priority of Korean Patent Application No. 2003-21413, filed on Apr. 4, 2003, in the Korean Intellectual Property Office, the disclosure of which is incorporated herein by reference.

BACKGROUND OF THE INVENTION

1. Field of the Invention

The present invention relates to packet routing using mobile Internet Protocol version 6 (IPv6), and more particularly, to a home agent management apparatus and method for routing a packet using a home network equipment as a home agent.

2. Description of the Related Art

In mobile IPv6 systems, a position of a mobile node can be found using a unique home address of the mobile node regardless of whether the mobile node is presently connected to a home link or a foreign link. Such a home address is a unique Internet Protocol (IP) address allocated to a mobile node within a home subnet prefix on a home link.

When a mobile node is on a home link and a packet having a home address of the mobile node as a destination address is transmitted, one of the home agents on the home link routes the packet using a conventional Internet routing mechanism. However, when a mobile node is connected not to a home link but to a foreign link, an access router of the foreign link allocates a temporary address referred to as a care-of-address (CoA) to the mobile node and routes a packet toward the mobile node of destination using the CoA. Such a CoA is an IP address related to a mobile node having a subnet prefix of a particular foreign link.

A mobile node can be allocated a CoA through a conventional IPv6 auto configuration mechanism. While the mobile node is being located on a foreign link, packets forwarded to the CoA are routed to the mobile node. In other words, it is a CoA that is temporarily allocated to a mobile node when the mobile node is not on a home link but on a foreign link.

A process of linking a home address of a mobile node to a CoA thereof is referred to as "binding". When the mobile node is not connected to a home link, it registers its primary CoA in a router on the home link, and the router serves as a home agent of the mobile node. The mobile node performs binding registration by sending a "binding update" message to the home agent. Then, the home agent returns a "binding acknowledgement" message to the mobile node. The binding update message and the binding acknowledgement message are transmitted using an extension header of an IPv6 packet.

In other words, the home agent determines whether the mobile node is located on a link including the home agent. If the mobile node is not located on the link, the home agent receives a binding update message from the mobile node and performs the binding to store the home address and the CoA of the mobile node in a memory referred to as a binding cache.

Thereafter, when a request for communication with the mobile node is received from a correspondent node, the home agent transmits packets to the mobile node using the CoA stored in the binding cache, which stores current mobile node location information, through tunneling. Afterwards, the mobile node directly communicates with the correspondent node through a return routability procedure and a binding update procedure.

Figure 1:
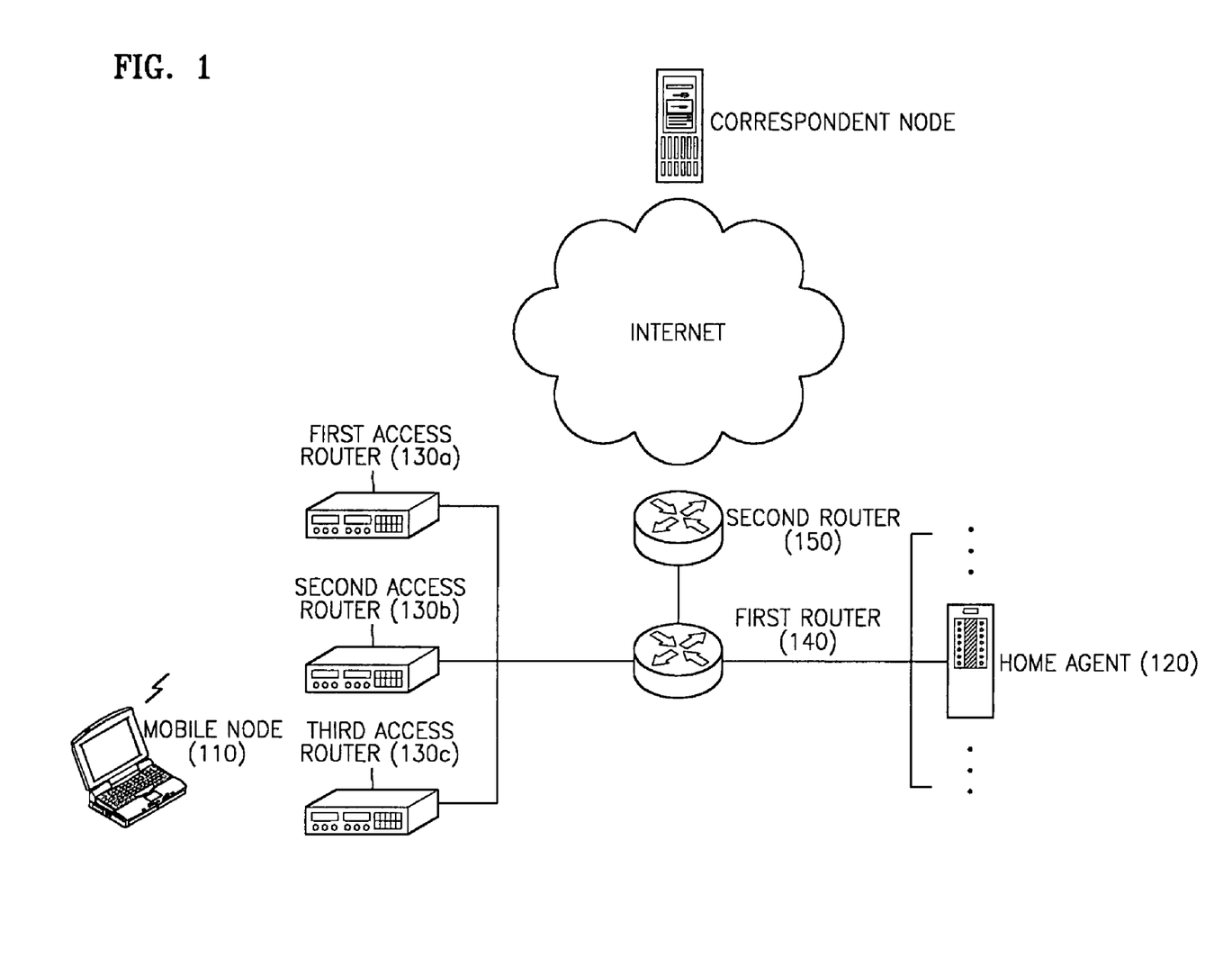
FIG. 1 shows a structure of an Internet Protocol version 6 (IPv6) network including a home agent, a mobile node, and a correspondent node.

FIG. 1 shows a structure of an IPv6 network including a home agent, a mobile node, and a correspondent node. According to mobile IPv6 standards, a plurality of home agents 120 can exist on a single link in correspondence to a single mobile node 110.

As shown in FIG. 1, the home agents 120 are located at a particular place, and at present, every home does not have a network equipment functioning as a home agent. Accordingly, even if a physical layer of a mobile IPv6 is a wireless local area network (LAN) or a code division multiple access (CDMA) network, equipment functioning as a home agent are gathered at a particular place. In other words, home agents are gathered at a particular place and provide mobile IPv6 services to every mobile node accessing a wide area network (WAN) of an Internet Service Provider (ISP) providing network services.

A binding update message from the mobile node 110 located on a foreign link is transmitted to a home agent 120 via one of the first through third access routers 130a through 130b and via a first router 140. A data packet is transmitted to an Internet network via the first router 140 and a second router 150.

Figure 2:
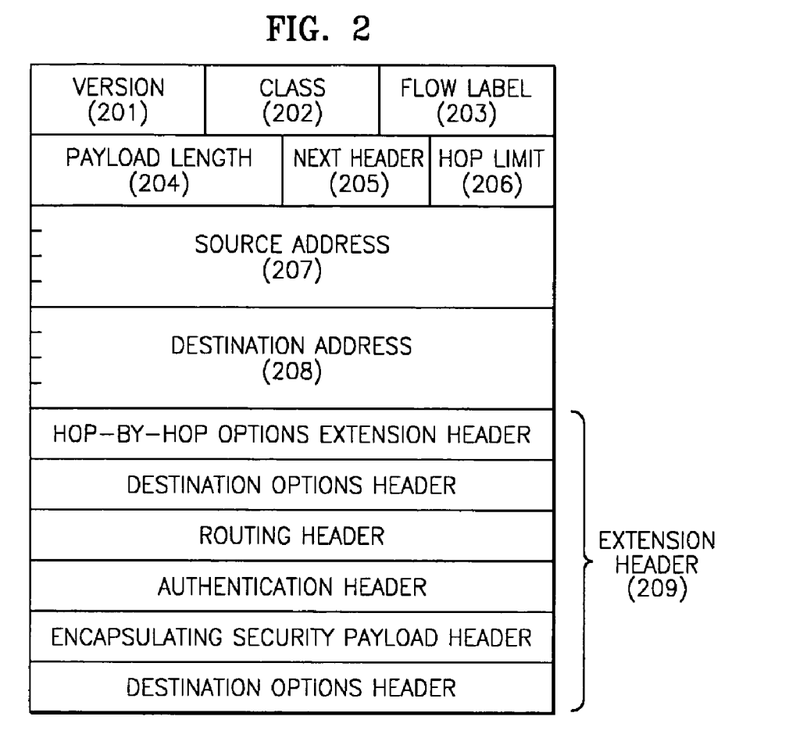
FIG. 2 shows a basic IPv6 header format.

FIG. 2 shows a basic IPv6 header format. A basic IPv6 header includes a version field 201, a class field 202, a flow label field 203, a payload length field 204, a next header field 205, a hop limit field 206, a source address field 207, a destination address field 208, and an extension header field 209.

Figure 3:
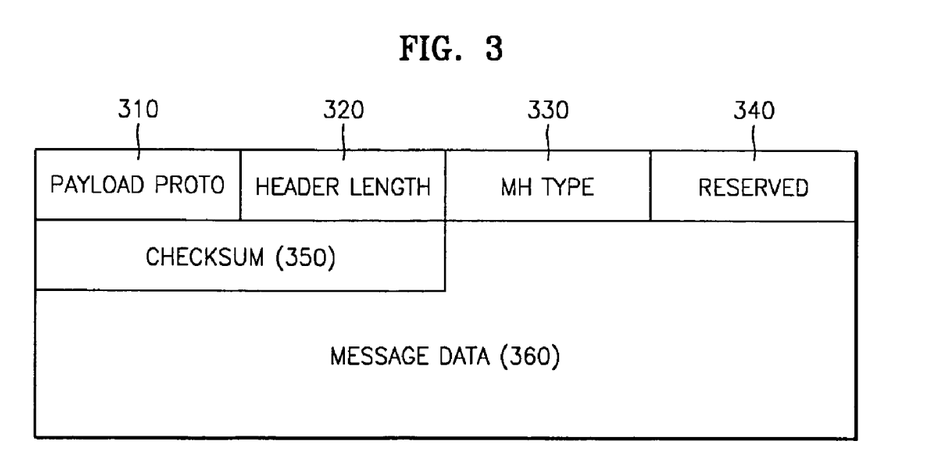
FIG. 3 shows a mobility header (MH) format.

FIG. 3 shows a mobility header (MH) format. An NH includes a payload proto field 310, a header length field 320, an MH type field 330, a reserved field 340, a checksum field 350, and a message data field 360.

The NH is an extension header used in any types of messages related to generation of a binding. When information that mobile IPv6 data comes next is stored in the next header field 205 of the basic IPv6 header format shown in FIG. 2, the MH follows the basic IPv6 header.

Figure 4:
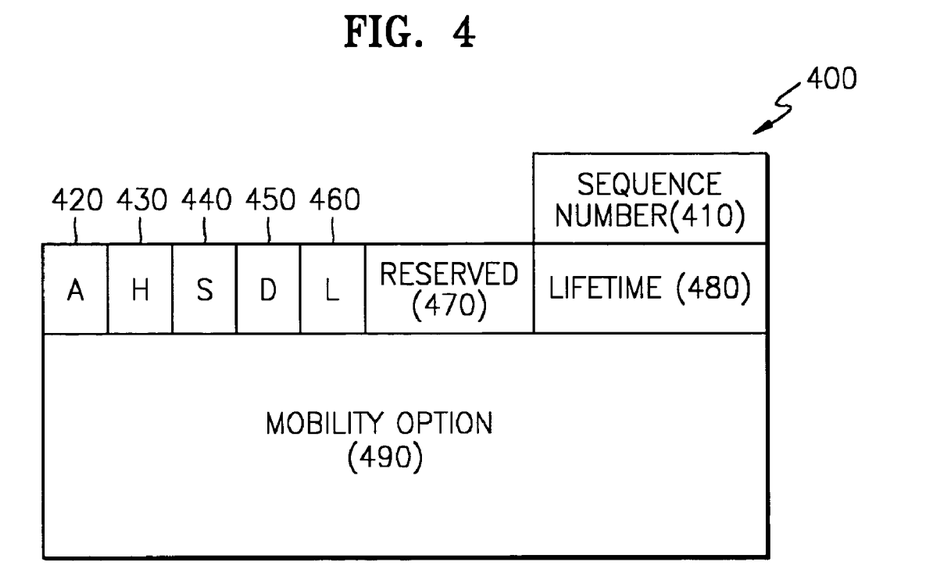
FIG. 4 shows a binding update message.

The payload proto field 310 has the same value as the next header field 205. The header length field 320 indicates a length of the MH. The MH type field 330 indicates a type of the MIH. For example, the NH type field 330 having a value of 0 indicates that the message data field 360 contains a binding refresh message. The MH type field 330 having a value of 5 indicates that the message data field 360 contains a binding update message. In other words, the binding update message is recorded in the message data field 360 of the MH, as shown in FIG. 4. The MH type field 330 having a value of 6 indicates that the message data field 360 contains a binding acknowledgement message. In other words, the binding acknowledgement message is recorded in the message data field 360 of the MH, as shown in FIG. 5.

FIG. 4 shows a binding update message 400. A mobile node uses the binding update message 400 to inform a home agent of its new CoA. The binding update message 400 includes a sequence number field 410, an acknowledge field (A) 420, a home registration field (H) 430, a single address only field (S) 440, a duplicate address detection field (D) 450, a link-local address compatibility field (L) 460, a reserved field 470, a lifetime field 480, and a mobility option field 490. The lifetime field 480 indicates the number of time units left before binding expires. A single time unit can be 4 seconds.

Figure 5:
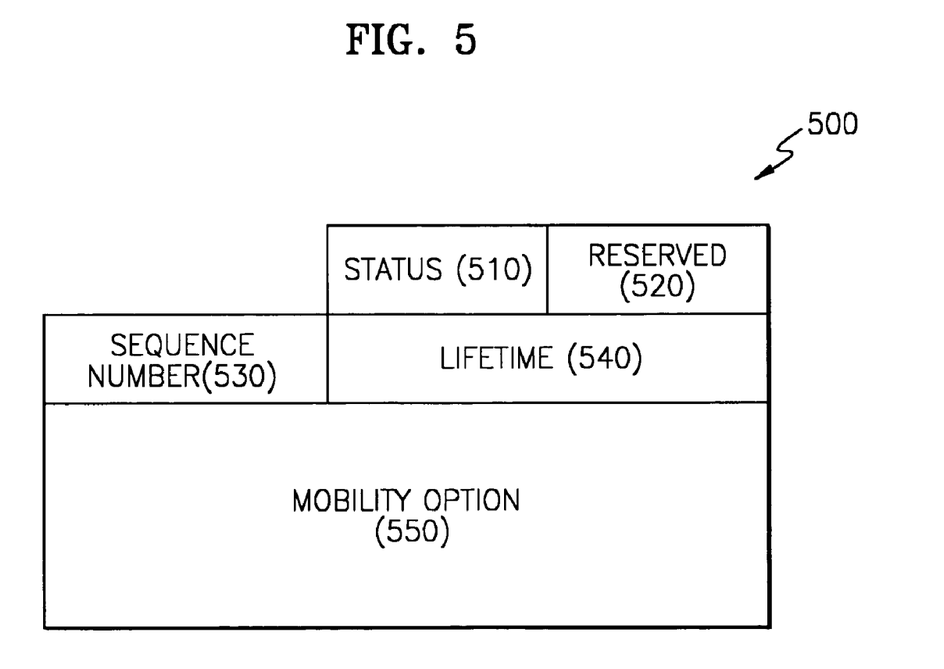
FIG. 5 shows a binding acknowledgement message.

FIG. 5 shows a binding acknowledgement message 500. The binding acknowledgement message 500 includes a status field 510, a reserved field 520, a sequence number field 530, a lifetime field 540, and a mobility option field 550.

The status field 510 is composed of an 8-bit integer without a sign and indicates a characteristic of a binding update. The status field 510 having a value smaller than 128 indicates that the binding update has been accepted by a reception node, and the status field 510 having a value equal to or greater than 128 indicates that the binding update has been rejected by the reception node. For example, when the status field 510 has a value of 0, the binding update has been accepted. The sequence number field 530 of the binding acknowledgement message 500 is a copy of the sequence number field 410 of the binding update message 400 and is used to match the binding acknowledgement with the binding update.

However, when a binding procedure is performed using home agents included only in an ISP, each home agent is burdened with too many processing loads. Moreover, since network equipment is increasingly used at home, it is inefficient to perform the binding procedure using only home agents of the ISP without using home network equipment.

SUMMARY OF THE INVENTION

The present invention provides a home agent management apparatus and method for splitting a load between home agents in an Internet service provider (ISP) and home agents at home.

According to an aspect of the present invention, there is provided an apparatus for managing at least one home agent of a home network in a network. The apparatus includes a packet analyzer, which receives a packet and analyzes the packet; a database, which stores information indicating whether the home agent operates normally according to the result of the analysis; and a home agent function executor, which performs a home agent function in place of the home agent when the home agent does not operate normally.

Preferably, the database includes a binding check database, which stores information indicating whether a binding acknowledgement message for a binding update message has been received within a predetermined time; and a proxy binding cache memory, which stores information on the home agent that does not operate normally.

According to another aspect of the present invention, there is provided a method of managing one or more home agents of a home network in a network. The method includes determining whether a home agent operates normally using a database, which stores information on home agents that do not operate normally; and when it is determined that the home agent does not operate normally, performing a home agent function in place of the home agent.

According to still another aspect of the present invention, there is provided a method of managing one or more home agents of a home network in a network. The method includes determining whether a home agent operates normally using a database, which stores information on home agents that do not operate normally; and when it is determined that the home agent does not operate normally, performing a home agent function in place of the home agent.

According to still another aspect of the present invention, there is provided a home agent management method including reading a network prefix recorded in a destination address field of a packet received from an access router; forwarding the packet to a network corresponding to the network prefix; when the network prefix corresponds to a home network, storing the packet received from the access router; determining whether the packet is a binding update message; when it is determined that the packet is the binding update message, extracting a home agent address and a care-of-address from the binding update message; determining whether an entry comprising the home agent address and the care-of-address has been stored in a binding check database; when it is determined that the entry has not been stored in the binding check database, adding the entry to the binding check database, increasing a count corresponding to the entry, and deleting the packet and when it is determined that the entry has been stored in the binding check database, increasing the count and determining whether the count reaches a predetermined value; and when it is determined that the count does not reach the predetermined value, deleting the packet and when it is determined that the count reaches the predetermined value, storing the entry in a proxy binding cache, deleting the packet, and deleting the entry from the binding check database.

According to still another aspect of the present invention, there is provided a computer readable recording medium having recorded therein a program for executing one of the above-described methods in a computer.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 6:
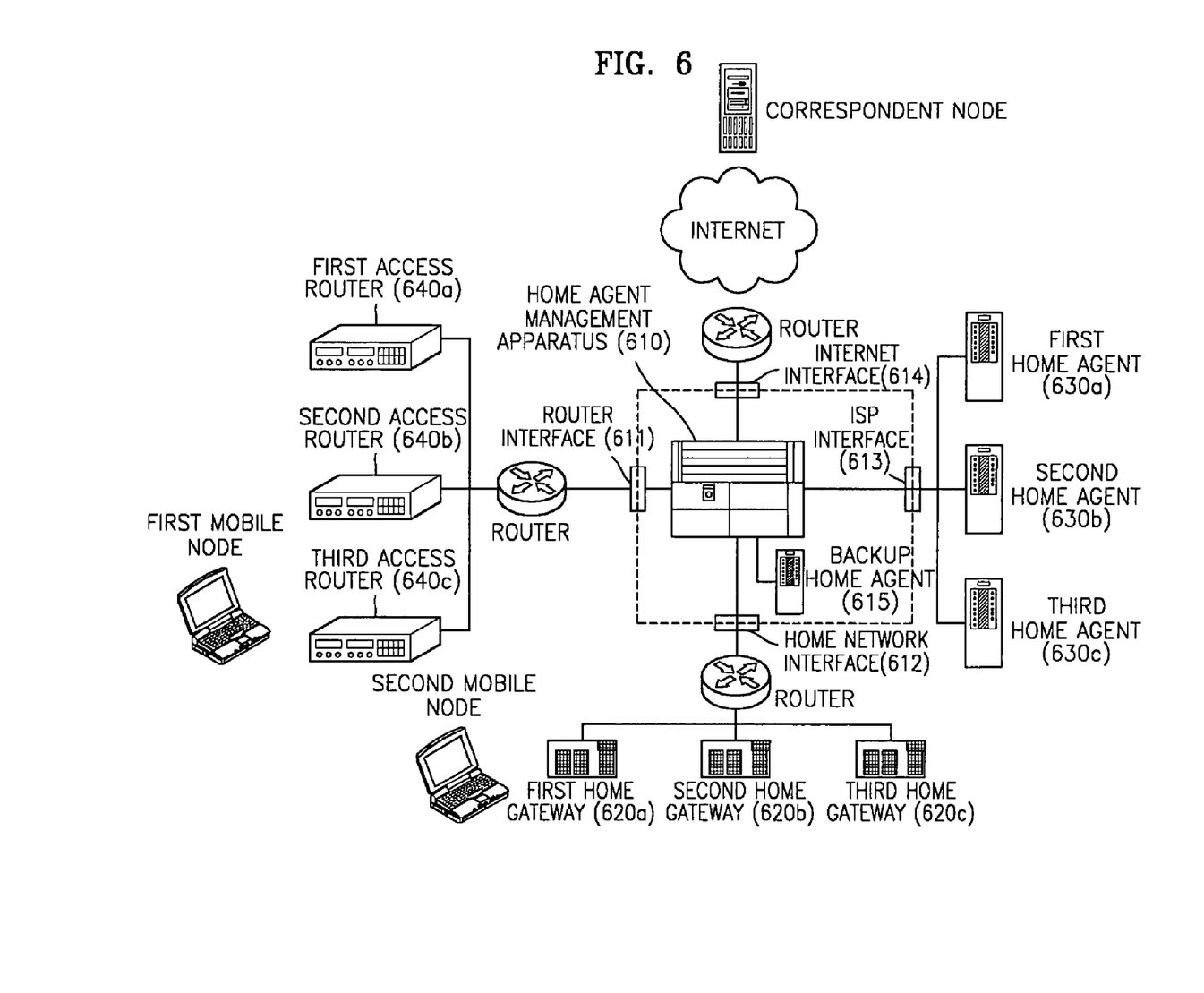
FIG. 6 shows an example of an IPv6 network using a home agent management apparatus according to the present invention.

FIG. 6 shows an example of an Internet Protocol version 6 (IPv6) network using a home agent management apparatus 610 according to the present invention. Referring to FIG. 6, the home agent management apparatus 610 manages first through third home gateways 620a through 620c at home and first through third home agents 630a through 630c included in an Internet service provider (ISP). In other words, when a network equipment such as a home gateway, which can perform a function of a home agent, exists at home, a home agent in an ISP is not necessarily used. The home gateway at home is used as a home agent while the home gateway operates normally. When a network equipment at home is used as a home agent, a binding-related processing load concentrated on a home agent of the ISP can be remarkably reduced.

When a home gateway at home does not operate normally, the home agent management apparatus 610 performs a function of a home agent. The home agent management apparatus 610 is provided with a backup home agent 615 to perform a home agent function in place of a home gateway at home.

As shown in FIG. 6, the home agent management apparatus 610 has a router interface 611, a home network interface 612, an ISP interface 613, and an Internet interface 614.

Figure 7:
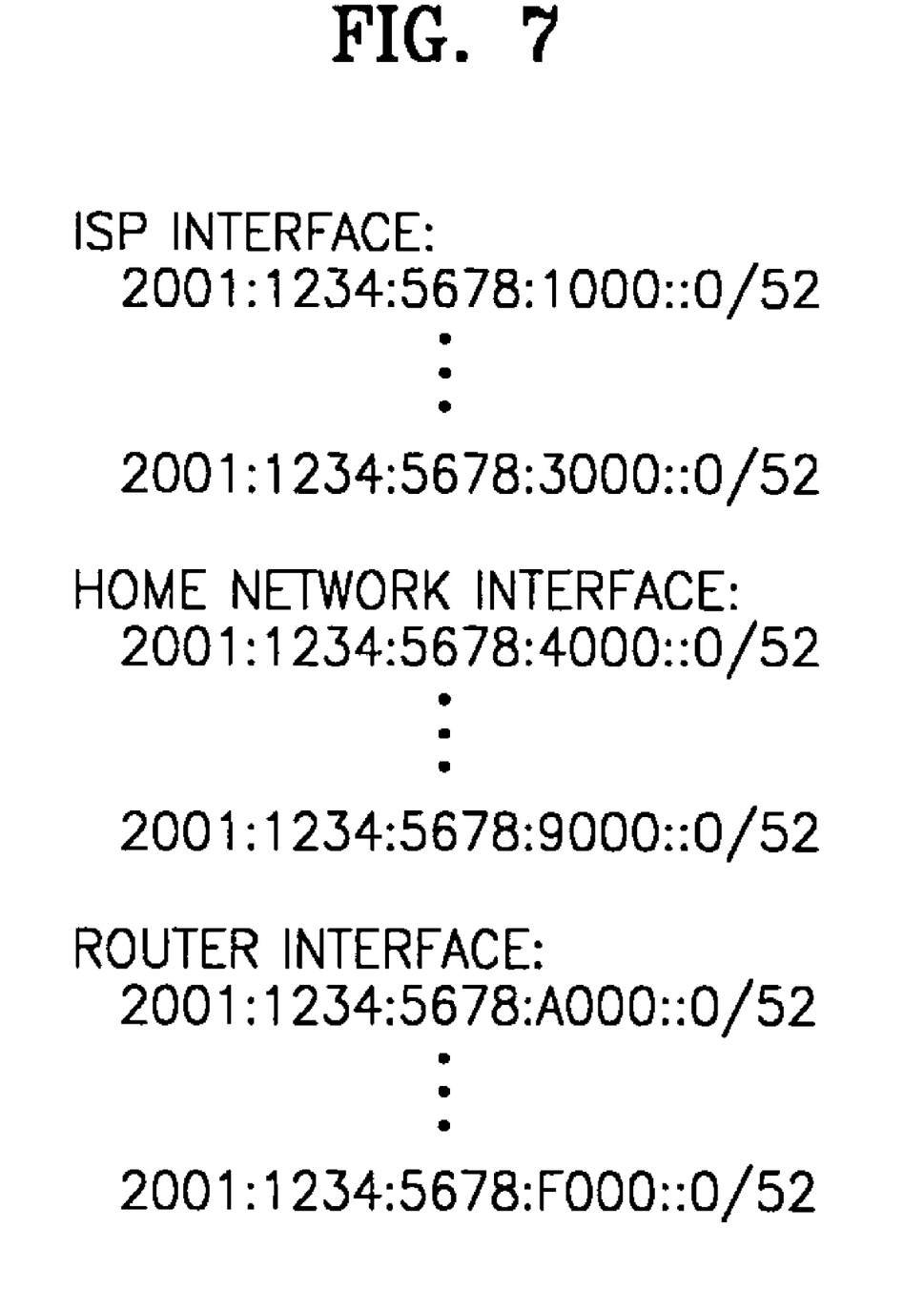
FIG. 7 shows examples of network prefixes allocated to different interfaces in a home agent management apparatus according to the present invention.

FIG. 7 shows examples of network prefixes allocated to different interfaces in a home agent management apparatus according to the present invention. Predetermined network prefixes are distributed to the ISP interface 613 allocated for the first through third home agents 630a through 630c of the ISP, to the home network interface 612 allocated for the first through third home gateways 620a through 620c at home and to the router interface 611 allocated for first through third access routers 640a through 640c. The home agent management apparatus routes packets received through each interface according to a network prefix. When a received packet is directed to a home agent of the ISP, the packet is forwarded through the ISP interface 613. When a received packet is directed to an access router, the packet is forwarded through the router interface 611. When a received packet is directed to the external Internet, the packet is forwarded through the Internet interface 614. When a packet is directed to a home gateway, i.e., a home agent of a home network, the home agent management apparatus forwards the packet through the home network interface 612 or directly performs a home agent function before forwarding the packet.

In FIG. 6, the home agent management apparatus 610 is located at the center of all paths. However, a general router having excellent performance can be located at the place of the home agent management apparatus 610, and the home agent management apparatus 610 can be located below the general router.

Figure 8:
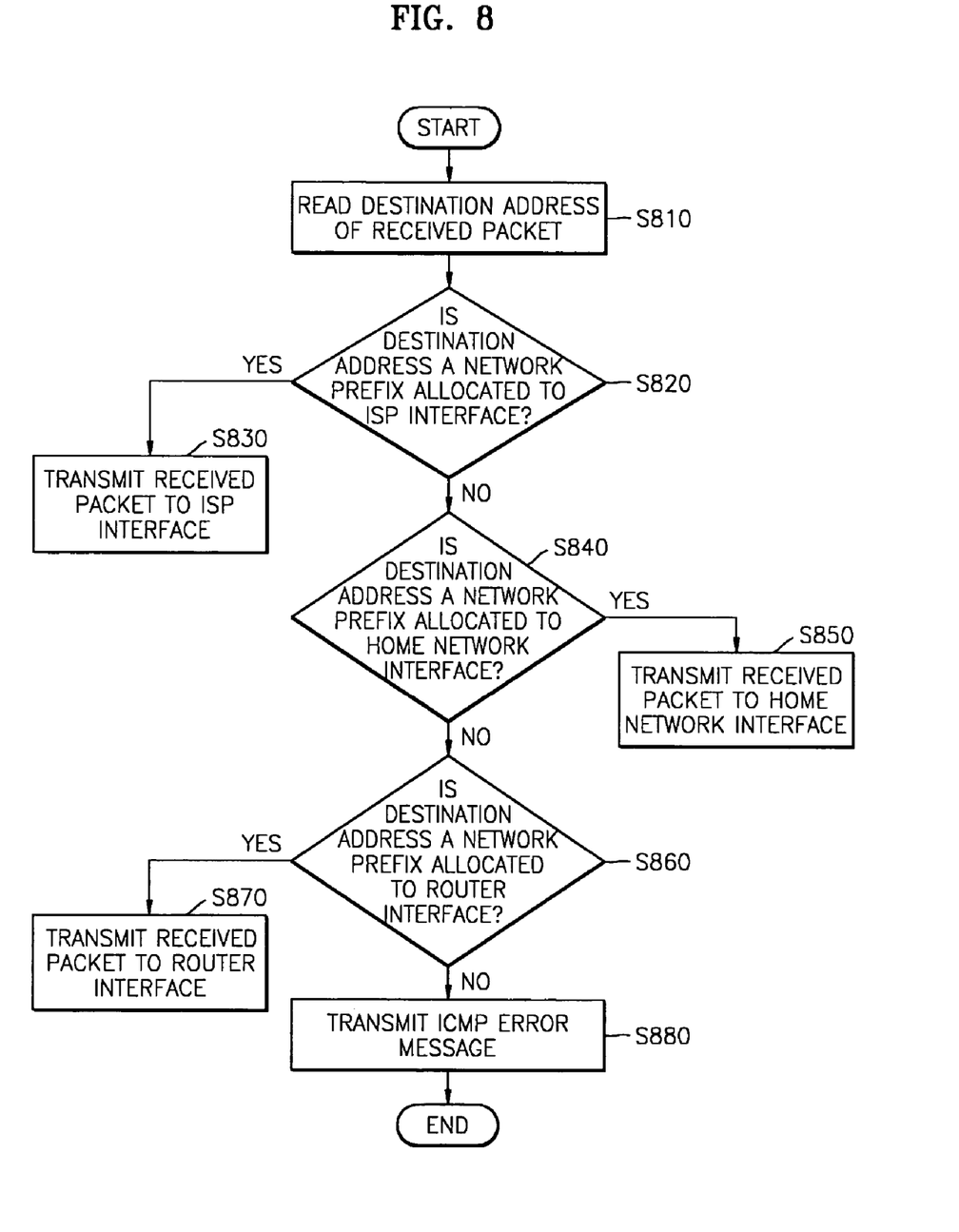
FIG. 8 is a flowchart of a procedure of forwarding a received packet through an interface of a home agent management apparatus, according to an embodiment of the present invention.

FIG. 8 is a flowchart of a procedure of forwarding a received packet through an interface of a home agent management apparatus, according to an embodiment of the present invention. A destination address of a received IPv6 packet is read (S810). In other words, the destination address field 208 of the basic IPv6 header shown in FIG. 2 is read in order to determine where to transmit the received packet. It is determined whether the destination address is a network prefix allocated to an ISP interface (S820). If it is determined that the destination address is a network prefix allocated to the ISP interface, the received packet is transmitted to the ISP interface (S830). If it is determined that the destination address is not a network prefix allocated to the ISP interface, it is determined whether the destination address is a network prefix allocated to a home network interface (S840). If it is determined that the destination address is a network prefix allocated to the home network interface, the received packet is transmitted to the home network interface (S850). If it is determined that the destination address is not a network prefix allocated to the home network interface, it is determined whether the destination address is a network prefix allocated to a router interface (S860). If it is determined that the destination address is a network prefix allocated to the router interface, the received packet is transmitted to the router interface (S870). When it is determined that the destination address is not a network prefix allocated to any of the interfaces, an Internet Control Message Protocol (ICMP) error message is output (S880) since where the received packet is to be transmitted is not known, and the operation ends.

Figure 9:
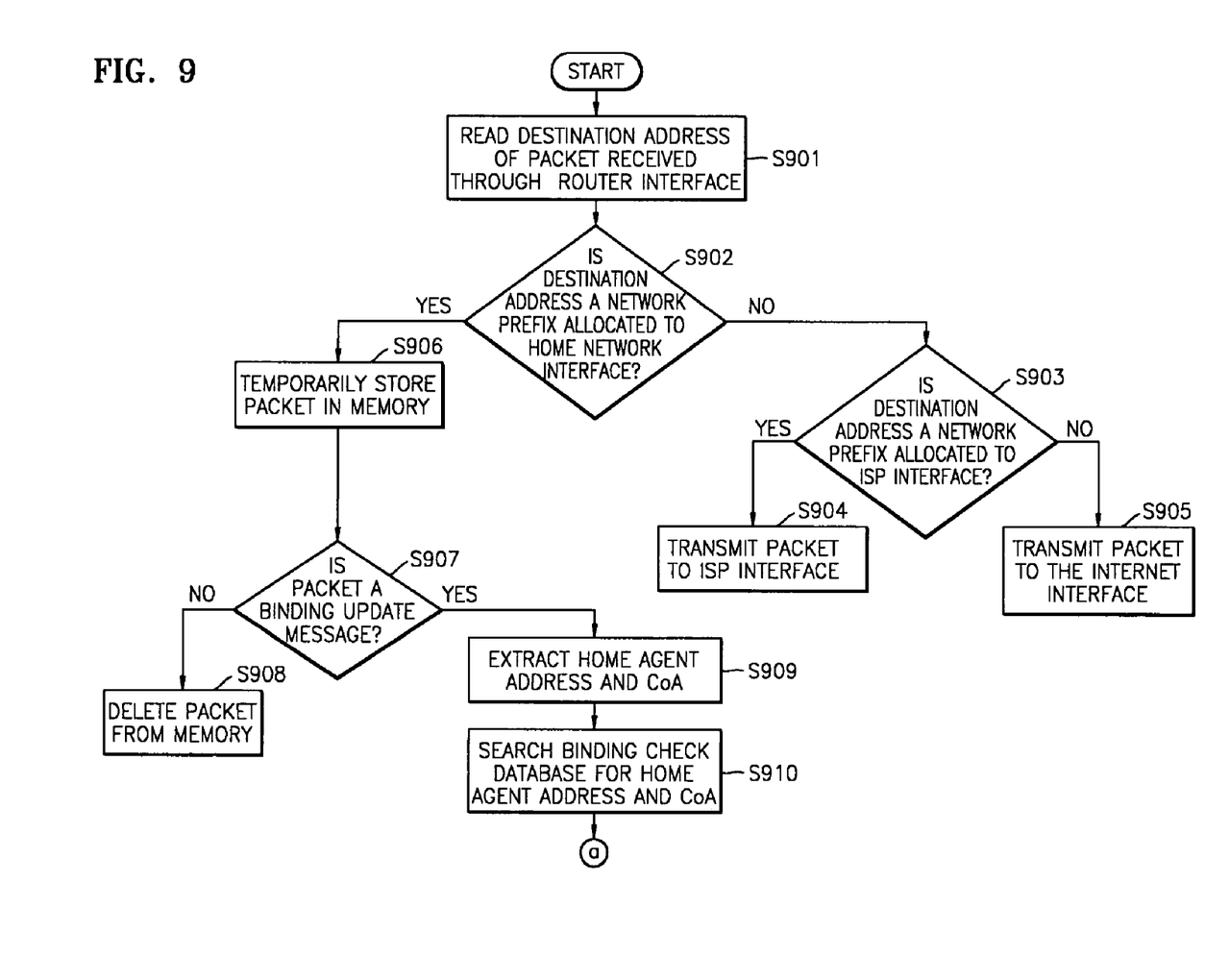
FIG. 9 is a flowchart of a procedure of processing a packet received through a router interface, according to an embodiment of the present invention.
Figure 10A:
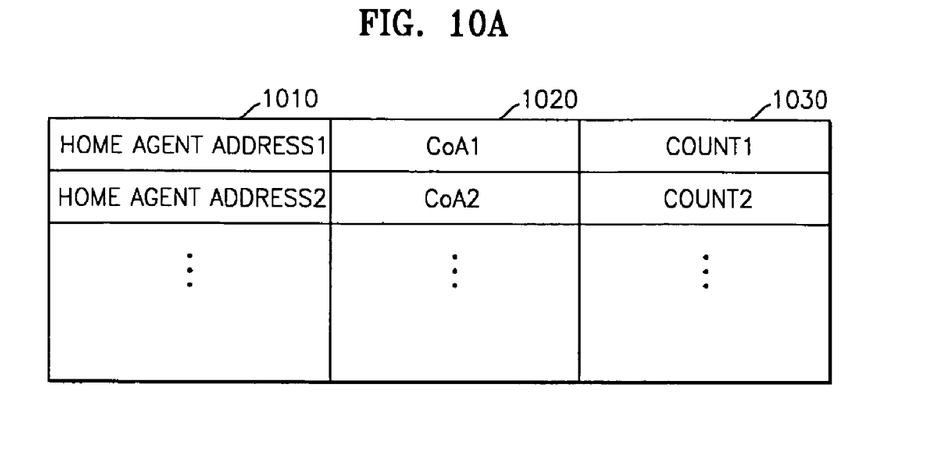
FIG. 10A shows entries stored in a binding check database.
Figure 10B:
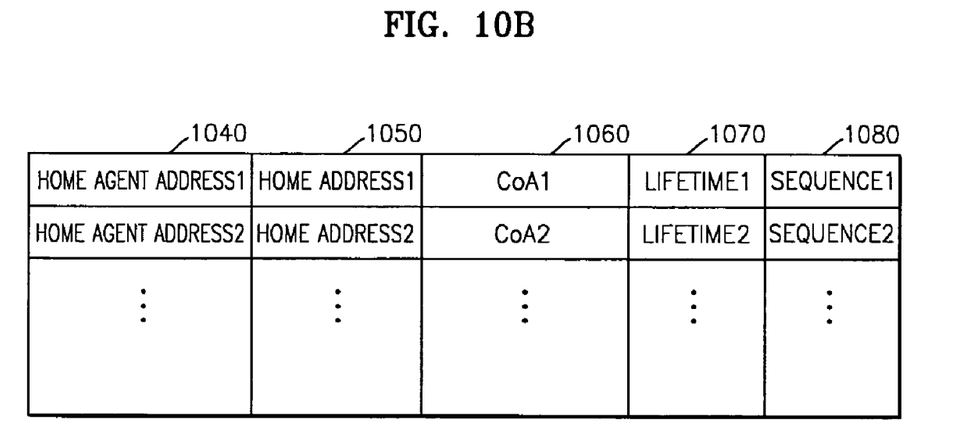
FIG. 10B shows information stored in a proxy binding cache.
Figure 11:
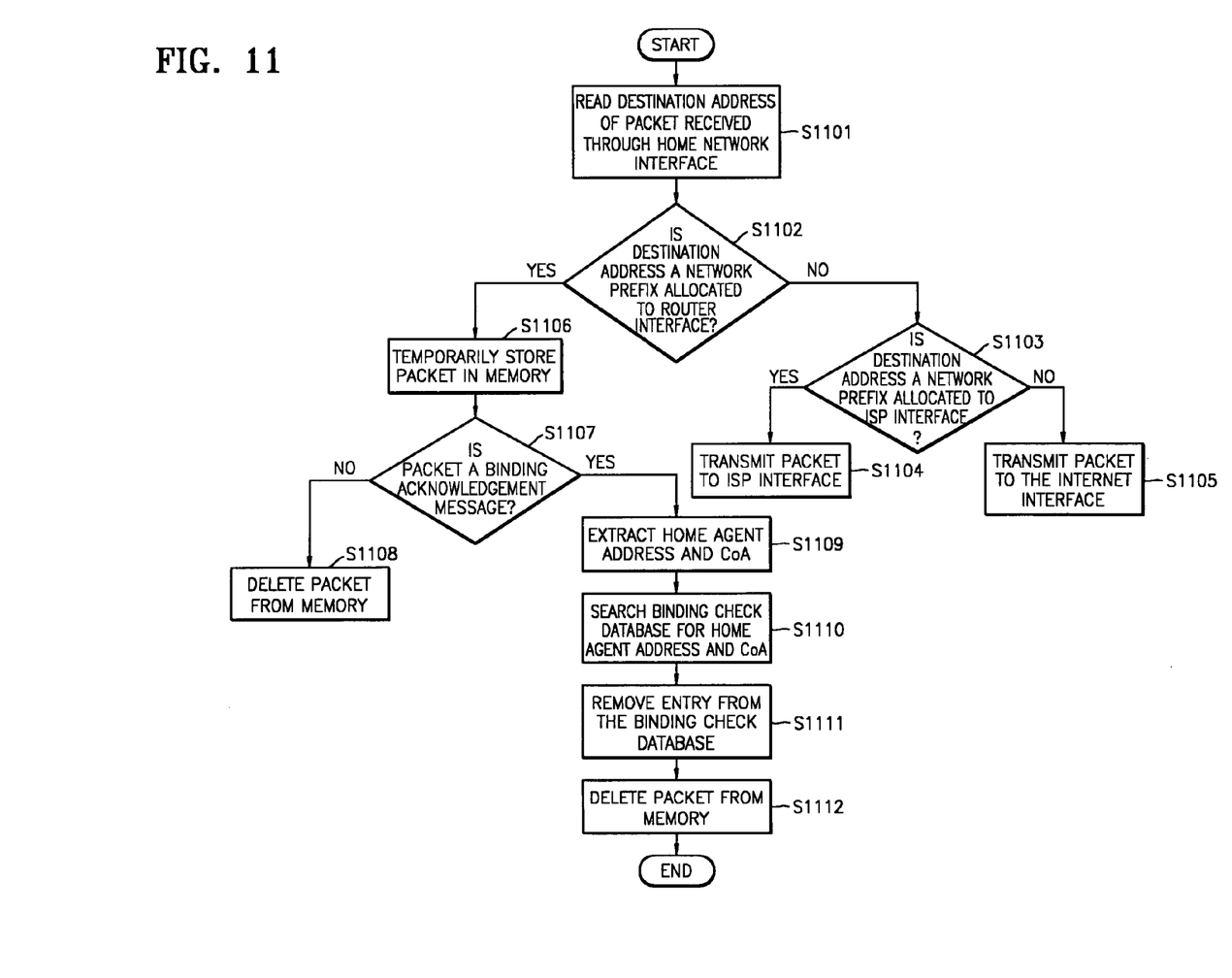
FIG. 11 is a flowchart of a procedure of processing a packet received through a home network interface.

While the home agent management apparatus forwards a received packet through one of its interfaces, as shown in FIG. 8, it temporarily stores a received packet in a memory and performs a binding procedure, as shown in FIGS. 9 through 11.

FIG. 9 is a flowchart of a procedure of processing a packet received through a router interface, according to an embodiment of the present invention. When the home agent management apparatus receives a packet directed to the home network interface but a home agent of the home network cannot perform a home agent function due to various causes, the home agent management apparatus generates data related to binding and manages the data to perform the home agent function in place of the home agent of the home network. This operation of the home agent management apparatus will be described in detail with reference to FIG. 9.

A destination address field of a packet received through the router interface is read (S901). It is determined whether a destination address read from the destination address field is a network prefix allocated to the home network interface (S902). If it is determined that the destination address is not a network prefix allocated to the home network interface, it is determined whether the destination address is a network prefix allocated to the ISP interface (S903). According to the result of the determination, the packet is forwarded through the ISP interface (S904) or through the Internet interface (S905).

If it is determined that the destination address is a network prefix allocated to the home network interface, the packet is temporarily stored in the memory (S906). It is determined whether the packet is a binding update message (S907). If it is determined that the packet is not the binding update message, the packet is discarded (S908). If it is determined that the packet is the binding update message, a home agent address and a care-of-address (CoA) are extracted from the packet (S909). A binding check database is searched for the home agent address and the CoA (S910). The binding check database will be described in detail later with reference to FIG. 10A. The home agent address and the CoA can be known from a source address field and a destination address field of an IPv6 header.

If it is determined that the home agent address and the CoA have not been stored in the binding check database (S911), an entry is composed including the home agent address, the CoA, and a count and the entry is stored in the binding check database, and then the count is increased by one (S912). Next, the packet is deleted from the memory (S913).

If it is determined that the home agent address and the CoA have been stored in the binding check database in step S911, the count is increased by one (S914). It is determined whether the count is a predetermined value (for example, 3) (S915). If it is determined that the count is not the predetermined value, the packet is deleted from the memory (S916). The predetermined value indicates a duration between transmission of a binding update message and reception of a binding acknowledgement message. Standards describes that the duration is about 30 seconds, but the present invention is not restricted thereto.

If it is determined that the count stored in the binding check database is the predetermined value, an entry composed of the home agent address, the CoA, a home address, and a lifetime, a sequence is generated and stored in a proxy binding cache (S917). The packet is deleted from the memory (S918), and then the entry is deleted from the binding check database (S919). If the count stored in the binding check database reaches the predetermined value, that means that the binding acknowledgement message for the binding update message is not received during a predetermined period of time, that is, trouble occurs in a home agent of a home network. Accordingly, afterwards, the home agent management apparatus performs the home agent function in place of the home agent of the home network.

Generally, since network equipment managed by an ISP is reliable and can provide services without interruption, an IPv6 can be reliably serviced when a home agent of the ISP is used. However, when a load is concentrated on the home agent of the ISP, it is necessary to split the load by using a home agent of a home network.

However, the home agent of the home network is less reliable than the home agent of the ISP. Moreover, even if the reliability of the home agent of the home network is guaranteed, an uninterruptible power service cannot be provided. Accordingly, the home agent of the home network is used in a normal state, but when the home agent of the home network is downed, the home agent management apparatus functions as a proxy performing the home agent function in place of the home agent of the home network in order to provide a reliable IPv6 service.

Thereafter, when the home agent of the home network is restored, the home agent of the home network accesses a network and simultaneously transmits a particular packet to the home agent management apparatus. Upon receiving the particular packet, the home agent management apparatus stops being a proxy for the home agent of the home network and deletes a temporarily managed database.

FIG. 10A shows entries stored in the binding check database. The binding check database includes a home agent address field 1010, a CoA field 1020, and a count field 1030. The home agent address field 1010 stores an addresses of a home agent located on the home network. The CoA field 1020 stores a temporary address of a mobile node. A home agent address and a CoA correspond to a source address and a destination address, respectively, of an IPv6 header. A count stored in the count field 1030 is increased by one whenever a binding update message is received. The count is used to determine whether a binding acknowledgement message is received for a predetermined period of time since transmission of the binding update message.

FIG. 10B shows information stored in the proxy binding cache. The proxy binding cache includes a home agent address field 1040, a home address field 1050, a CoA field 1060, a lifetime field 1070, and a sequence field 1080.

A home agent address stored in the home agent address field 1040 is obtained by reading a destination address field of a received IPv6 header. A home address stored in the home address field 1050 is obtained by reading a home agent option field of an extension header of the IPv6 header. A CoA stored in the CoA field 1060 corresponds to a source address of the IPv6 header. A lifetime stored in the lifetime field 1070 is the same as the lifetime recorded in the lifetime field 480 shown in FIG. 4, and a sequence stored in the sequence field 1080 is the same as the sequence number recorded in the sequence number field 410 shown in FIG. 4.

As have been described with reference to FIG. 9, information stored in the proxy binding cache is generated when a binding acknowledgement message is not received until a count corresponding to a particular home agent of a home network, which exists as an entry in the binding check database, reaches a predetermined value. The home agent address field 1040 is added to information stored in a binding cache of a conventional home agent in order to search the proxy binding cache or efficiently manage the proxy binding cache. When the home agent of the home network is restored and operates normally, it transmits a packet for instructing to delete an entry related to functioning as proxy for the home agent. Upon receiving the packet, the home agent management apparatus deletes the entry corresponding to the home agent of the home network from the proxy binding cache.

FIG. 11 is a flowchart of a procedure of processing a packet received through the home network interface. A destination address of a packet received through the home network interface is read (S1101). It is determined whether the destination address is a network prefix allocated to the router interface (S1102). If it is determined that the destination address is not a network prefix allocated to the router interface, it is determined whether the destination address is a network prefix allocated to the ISP interface (S1103). If it is determined that the destination address is a network prefix allocated to the ISP interface, the packet is transmitted to the ISP interface (S1104). If it is determined that the destination address is not a network prefix allocated to the ISP interface, the packet is transmitted to the Internet interface (S1105).

If it is determined that the destination address is a network prefix allocated to the router interface, the packet is temporarily stored in the memory (S1106), and it is determined whether the packet is a binding acknowledgement message (S1107). If it is determined that the packet is not a binding acknowledgement message, the packet is deleted from the memory (S1108). If it is determined that the packet is the binding acknowledgement message, a home agent address and a CoA are extracted from the packet (S1109). It is determined whether the home agent address and the CoA have been stored in the binding check database (S1110). The home agent address and the CoA can be known from a source address field and a destination address field, respectively, of an IPv6 header. If it is determined that the home agent address and the CoA have been stored in the binding check database, an entry corresponding to the home agent address and the CoA is deleted from the binding check database (S1111), and then the packet is removed from the memory (SI 112).

Figure 12:
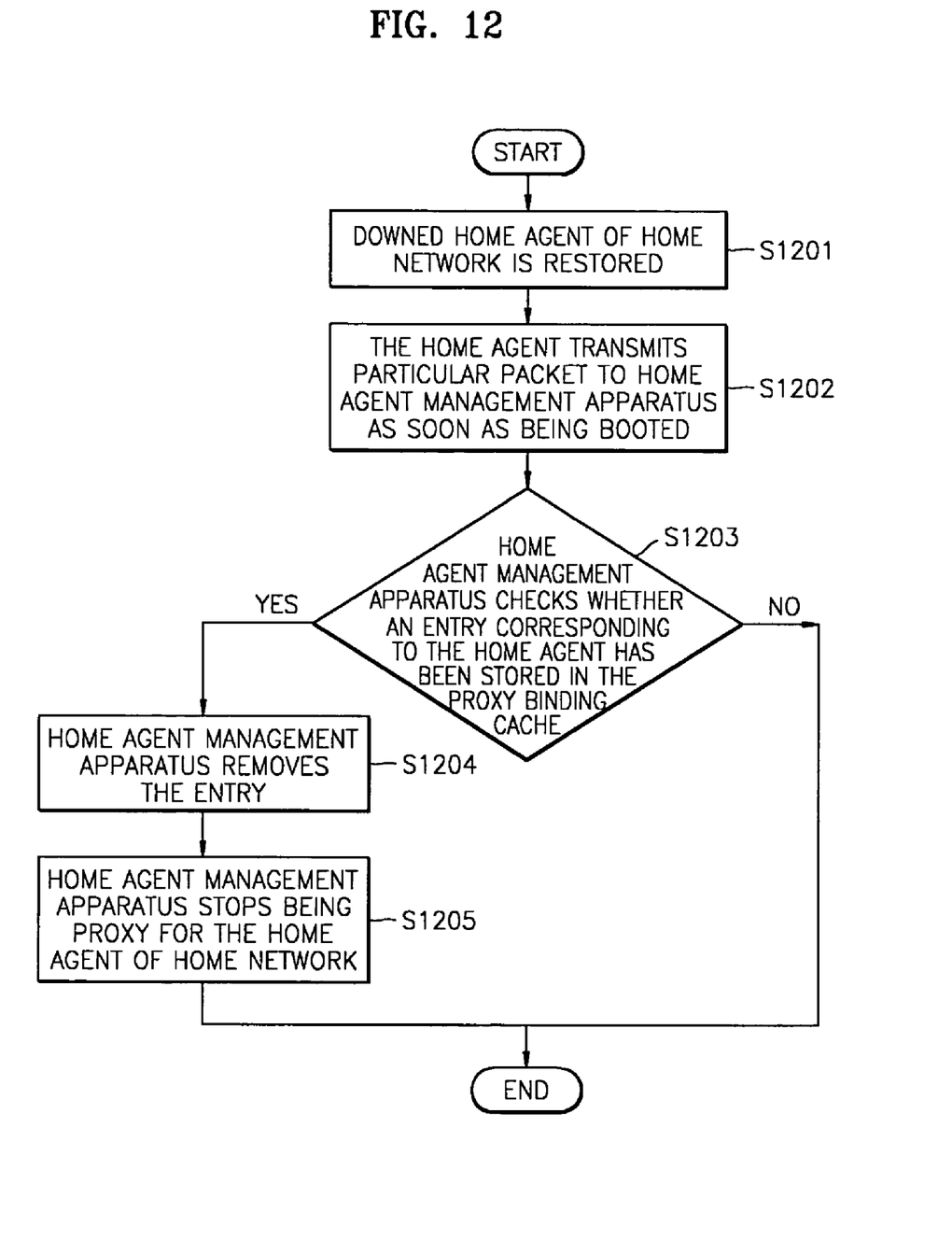
FIG. 12 is a flowchart of a procedure of stopping a home agent function performed by the home agent management apparatus as proxy for a home agent of a home network after the home agent is restored.

FIG. 12 is a flowchart of a procedure of stopping a home agent function performed by the home agent management apparatus as proxy for a home agent of a home network after the home agent is restored. When a downed home agent of a home network is restored (S 1201), the home agent of the home network transmits a particular packet to the home agent management apparatus as soon as it is booted (S1202). The particular packet indicates that the home agent of the home network is restored, that is, the home agent management apparatus does not need to be proxy for the home agent of the home network any more.

Upon receiving the particular packet, the home agent management apparatus checks whether an entry corresponding to the home agent has been stored in the proxy binding cache (S 1203). If the entry has not been stored in the proxy binding cache, the operation ends. If the entry has been stored in the proxy binding cache, the home agent management apparatus deletes the entry from the proxy binding cache (S1204) and stops being proxy for the home agent of the home network (S 1205).

Figure 13:
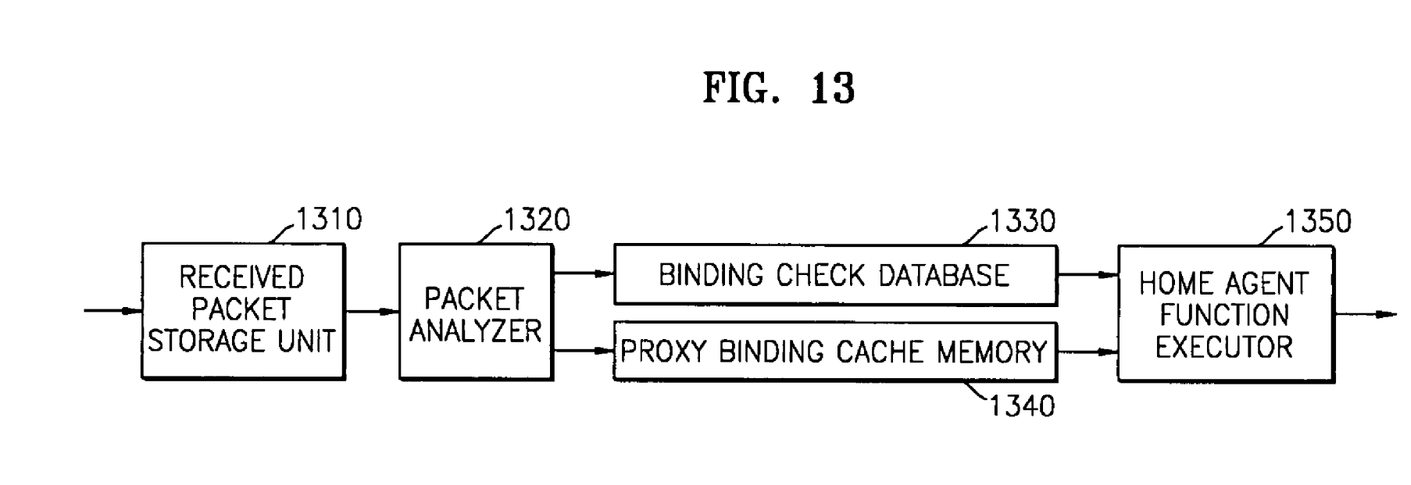
FIG. 13 is a block diagram of a home agent management apparatus according to an embodiment of the present invention.

FIG. 13 is a block diagram of a home agent management apparatus according to an embodiment of the present invention. The home agent management apparatus includes a received packet storage unit 1310, a packet analyzer 1320, a binding check database 1330, a proxy binding cache memory 1340, and a home agent function executor 1350.

The received packet storage unit 1310 temporarily stores a packet having a network prefix allocated to a home network interface or a packet received through the home network interface. The packet analyzer 1320 analyzes a packet stored in the received packet storage unit 1310 to determined whether the packet is a binding update message or a binding acknowledgement message. The binding check database 1330 and the proxy binding cache memory 1340 are included in a database, which stores information indicating whether a home agent of a home network normally functions according to the result of the analysis.

The binding check database 1330 stores a home agent address, a CoA, and a count of a received packet. The proxy binding cache memory 1340 stores a home agent address, a home address, a CoA, a lifetime, and a sequence of a received packet. When a home agent of a home network does not operate normally, the home agent function executor 1350 performs a home agent function in place of the home agent.

The present invention can be realized as a code which is recorded on a computer readable recording medium and can be read by a computer. The computer readable recording medium may be any type of medium on which data which can be read by a computer system can be recorded, for example, a ROM, a RAM, a CD-ROM, a magnetic tape, a floppy disc, or an optical data storage device. Alternatively, computer readable recording media are distributed among computer systems connected through a network so that the present invention can be realized as a code which is stored in the recording media and can be read and executed in the computers.

As described above, the present invention uses a home agent of a home network, thereby splitting a load concentrated on a home agent of an ISP. In addition, according to the present invention, when a home agent of a home network has a trouble, a home agent management apparatus functions as a proxy for the home agent and when the home agent is restored, the home agent management apparatus stops being proxy for the home agent to let the restored home agent perform its function normally. Therefore, packets can be more reliably processed.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for managing at least one home agent of a home network in a network, the apparatus comprising:
a packet analyzer, which receives a packet and analyzes the packet;
a database, which stores information indicating whether the home agent operates normally according to the result of the analysis; and
a home agent function executor, which performs a home agent function in place of the home agent when the home agent does not operate normally,
wherein the database comprises:
a binding check database, which stores information indicating whether a binding acknowledgement message for a binding update message has been received within a predetermined time; and
a proxy binding cache memory, which stores information on the home agent that does not operate normally.

2. The apparatus of claim 1, wherein the binding check database comprises a home agent address and a care-of-address, which are included in the binding update message, and a count.

3. The apparatus of claim 2, wherein the count is increased by one whenever the binding update message is received.

4. The apparatus of claim 1, wherein the proxy binding cache memory comprises a home agent address, a home address, a care-of-address, a lifetime, and a sequence included in the binding update message.

5. The apparatus of claim 1, further comprising a received packet storage unit, which stores the received packet.

6. A method of managing one or more home agents of a home network in a network, the method comprising:
determining whether a home agent operates normally using a database, which stores information on home agents that do not operate normally; and
when it is determined that the home agent does not operate normally, performing a home agent function in place of the home agent,
wherein the database comprises:
a binding check database, which stores information indicating whether a binding acknowledgement message for a binding update message has been received within a predetermined period of time; and
a proxy binding cache memory, which stores information on the home agents that do not operate normally.

7. The method of claim 6, wherein the binding check database comprises a home agent address and a care-of-address, which are included in the binding update message, and a count.

8. The method of claim 7, wherein the count is increased by one whenever the binding update message is received.

9. The method of claim 6, wherein the proxy binding cache memory comprises a home agent address, a home address, a care-of-address, a lifetime, and a sequence of a received packet.

10. A home agent management method comprising:
reading a network prefix recorded in a destination address field of a packet received from an access router;
forwarding the packet to a network corresponding to the network prefix;
when the network prefix corresponds to a home network, storing the packet received from the access router;
determining whether the packet is a binding update message;
when it is determined that the packet is the binding update message, extracting a home agent address and a care-of-address from the binding update message;
determining whether an entry comprising the home agent address and the care-of-address has been stored in a binding check database;
when it is determined that the entry has not been stored in the binding check database, adding the entry to the binding check database, increasing a count corresponding to the entry, and deleting the packet and when it is determined that the entry has been stored in the binding check database, increasing the count and determining whether the count reaches a predetermined value; and when it is determined that the count does not reach the predetermined value, deleting the packet and when it is determined that the count reaches the predetermined value, storing the entry in a proxy binding cache, deleting the packet, and deleting the entry from the binding check database.

11. The method of claim 10, wherein the binding check database comprises a home agent address and a care-of-address, which are included in the binding update message, and the count.

12. The method of claim 10, wherein the proxy binding cache comprises a home agent address, a home address, a care-of-address, a lifetime, and a sequence of the received packet.

13. A computer readable physical storage medium having recorded therein a program for executing on a computer a method of managing one or more home agents of a home network in a network, the method comprising:

determining whether a home agent operates normally using a database, which stores information on home agents that do not operate normally; and when it is determined that the home agent does not operate normally, performing a home agent function in place of the home agent, wherein the database comprises:

a binding check database, which stores information indicating whether a binding acknowledgement message for a binding update message has been received within a predetermined period of time; and a proxy binding cache memory, which stores information on the home agents that do not operate normally.

* * * * *

UNITED STATES PATENT AND TRADEMARK OFFICE
CERTIFICATE OF CORRECTION

PATENT NO.       : 7,626,957 B2                                                    Page 1 of 1
APPLICATION NO.  : 10/751436
DATED            : December 1, 2009
INVENTOR(S)      : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1726 days.

Signed and Sealed this

Twenty-first Day of December, 2010

David J. Kappos
*Director of the United States Patent and Trademark Office*